May 20, 1952     E. L. JOHNSON ET AL     2,597,002
LIVE BAIT CONTAINER

Filed Jan. 13, 1947                    2 SHEETS—SHEET 1

Inventors
Edwin L. Johnson
Emory J. Scofield
By Fishburn & Mullendore,
Attorneys May 20, 1952  E. L. JOHNSON ET AL  2,597,002
LIVE BAIT CONTAINER
Filed Jan. 13, 1947  2 SHEETS—SHEET 2
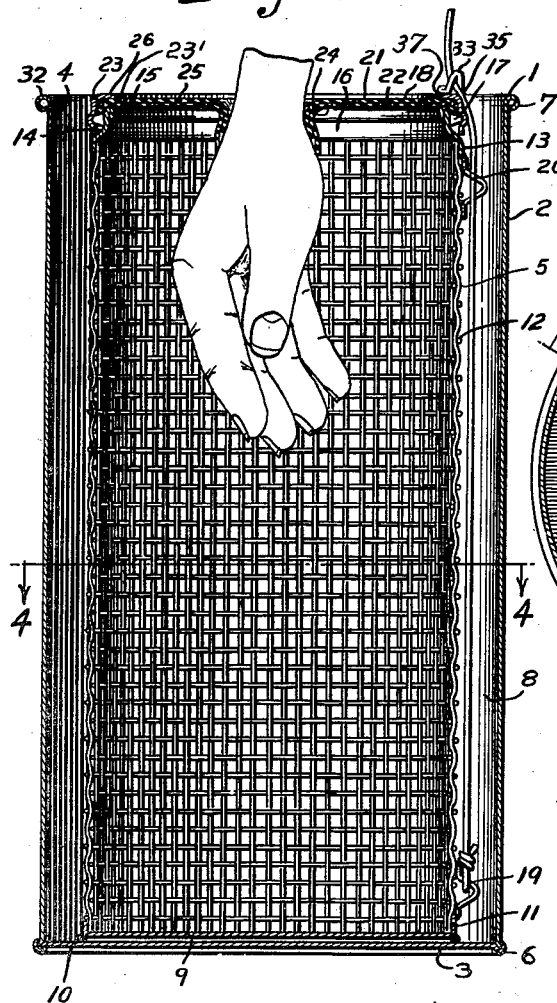
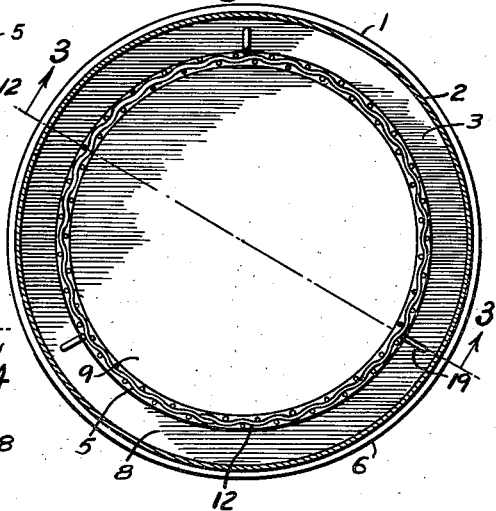
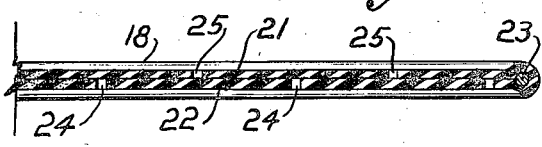
Inventors
Edwin L. Johnson
Emory J. Scofield
By Fishburn & Mullendore
Attorneys Patented May 20, 1952

2,597,002

UNITED STATES PATENT OFFICE 2,597,002

LIVE BAIT CONTAINER

Edwin L. Johnson and Emory J. Scofield,
Ottawa, Kans.

Application January 13, 1947, Serial No. 721,688

2 Claims. (Cl. 43—55)

This invention relates to improvements in live bait containers particularly adaptable for the prevention of escape of the bait from the container when the user removes bait from the container.

Attempts have heretofore been made to produce a bait box or container adapted to prevent escape of live bait therefrom, but such containers have not been entirely satisfactory.

The principal object of the present invention is therefore to provide a live bait box or container having a cover through which the hand of the user may be inserted without removing the top of the container and the top will engage the hand and arm of the user so that the bait cannot escape through the top of the container while the hand is inserted in the container.

Other objects of the invention are to provide a live bait box having an outer container with an open top; to provide a container which may be immersed in the water alongside the boat or bank of a body of water for keeping the bait in live condition; to provide a container having a perforated inner container having a cover which will prevent the water from entering directly on the bait when the container is being propelled through the water from the side of a boat or the like, thus protecting the bait; to provide means on the inner container and the outer container for removably attaching a bail for carrying or anchoring the bait box; to provide a removable lid on the inner container and means for retaining the lid on the container; and to provide a device of this character simple, and economical to manufacture.

In accomplishing these and other objects of the present invention, we have provided improved details of structure, the preferred form of which is illustrated in the accompanying drawings, wherein:

Fig. 3 is a vertical cross sectional view taken on a line 3—3, Fig. 4.

Fig. 4 is a cross section plan view taken on a line 4—4, Fig. 3.

Fig. 5 is a cross-sectional view taken on a line 5—5, Fig. 1.

Figure 1:
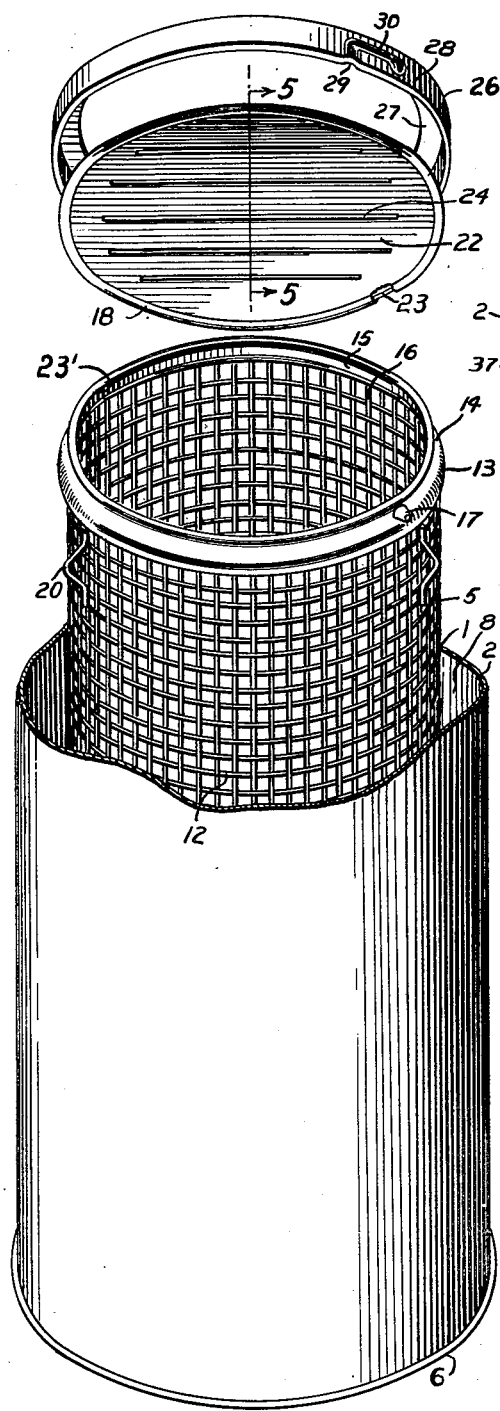
Fig. 1 is a perspective view of our invention showing the parts in disassembled relation and the outer container broken away to better illustrate the inner container.

Referring more in detail to the drawings:

I designates a bait container embodying the improvements of our invention comprising an outer container 2 having a bottom 3 and an open top 4 comprising a housing adapted to receive an inner perforated container 5 for the bait (not shown). While we have here illustrated the outer container 2 as substantially circular, it will be obvious that other forms may be used although we prefer an elongated container as we find they are more easily handled, particularly by the handle as here illustrated. The bottom is preferably provided with a rolled rim as indicated at 6 and the top also has a rolled rim 7 to provide added strength to the container.

The inner container 5 is slightly smaller than the outer container 2 to provide a space 8 between the walls thereof so that the outer container may hold a supply of water for the bait in the inner container. The inner container comprises a bottom 9 having rolled edges 10 and an upstanding flange 11 to which is attached by welding or other suitable means a wire screen 12 of substantially the same shape as the outer container. The upper end of the perforated container is provided with a metal flange 13 to which the upper end of the perforated wire screen is attached by welding or other suitable means. The flange 13 is tapered inwardly as indicated at 14 and the upper end rolled down as indicated at 15 (Fig. 3) to provide a stiffened rim for the open top 16 of the inner container. The flange 13 is provided with bosses 17 on its outer circumference adapted to engage a cover 18 for the inner container as will later be described.

Located near the bottom and top respectively of the inner perforated container and rigidly secured thereto are brackets 19 and 20 and spaced around the outer surface of the inner container which hold the inner container in spaced relation from the walls of the outer container so that the bait in the inner container will not be injured by contact against the walls of the outer container.

Figure 2:
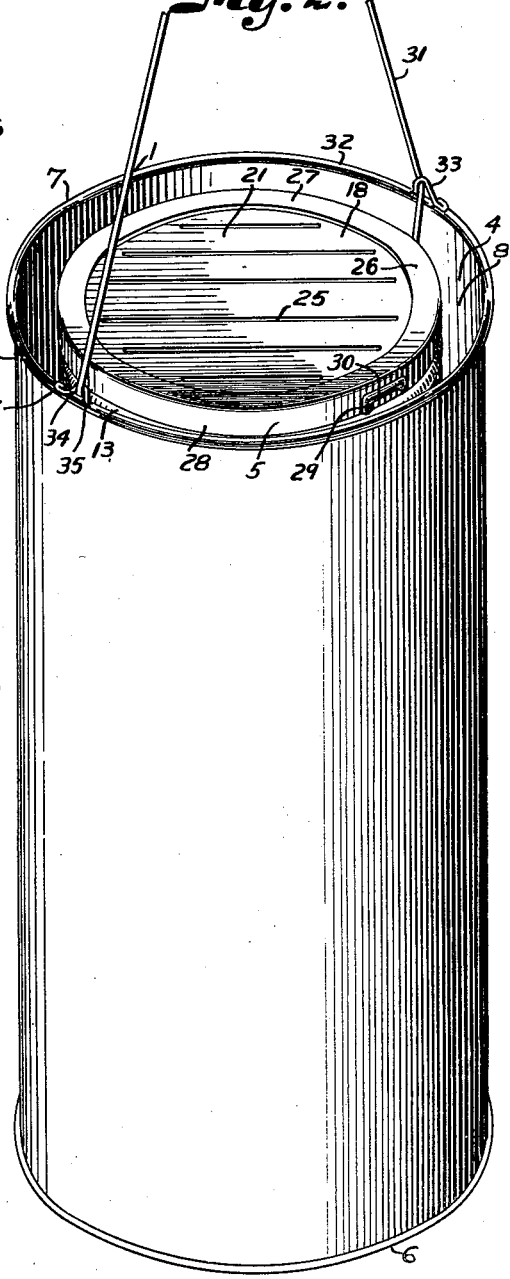
Fig. 2 is a perspective partly side view of the invention illustrating the top and bail for the container.

The cover 18 for the inner container 5 is preferably made of elastic material and is here illustrated as comprising sheets of rubber 21 and 22 vulcanized at their outer edges around a metal ring 23 (Fig. 3). The cover 18 is of a size to fit over the turned-down rim 23' of the top flange of the inner perforated container and the lower or under sheet 22 is provided with spaced slots 24 (Fig. 1) and the upper sheet 21 of the top is provided with spaced slots 25 (Fig. 2). The slots 25 are offset from the slots 24 so that they will not mate therewith as best illustrated in Fig. 5. The respective slots in the inner and outer sheets are so spaced that there will be no continuous open slots in the top 18 at any time.

A metal ring 26 is provided to fit over the cover 18 and engage the top 13 of the perforated container to retain the cover 18 on the perforated container. The ring 26 is provided with a top flange 27 and a depending flange 28. The depending flange 28 is provided with a vertical groove 29 terminating in a horizontal groove 30 forming a bayonet joint to lock the lid 18 on the container.

A bail 31 is provided having one end attached to the brackets 19 at the bottom of the perforated container and its opposite end attached to the brackets 20 at the top of the perforated container. The upper edge 32 of the outer container 2 is provided with oppositely facing hooks 33 and 34 having one end welded or otherwise secured to the rim as indicated at 35 and their opposite ends yieldingly engaging against but not integral with the rim 32 as indicated at 37 (Fig. 2). The bail 31 engages through the hooks 33 and 34 and is adapted to retain the perforated container in the outer container and to suspend the bait box in the water to keep the bait alive when contained in the container.

If desired the inner container may be disengaged from the outer container by removal of the bail from the hooks 33 and 34 and may be carried without the outer container. The bail may be a cord or other suitable material and if desired, may be swung over the shoulder of the user when wade-fishing.

In using a bait container constructed and assembled as described, the bait, such as frogs, minnows, grasshoppers or the like, may be placed in the inner perforated container 5 and when it is desired to remove the bait therefrom for use, the hand is inserted through the slots of the cover 18 as best illustrated in Fig. 3 and the rubber covering will engage the hand at all times to prevent the bait from escaping therefrom. The slots being offset in the respective sheets of the cover will provide a tight covering either when the hand is inserted therethrough or when removed therefrom.

When the device is being propelled through the water the closed top 18 will prevent direct force of water from striking the bait and prevent injury thereto.

It will be obvious from the foregoing that we have provided an improved bait container in which bait may be housed without injury during propulsion through the water on the side of a boat and one in which bait may be removed therefrom without danger of escape as with an open top container.

What we claim and desire to secure by Letters Patent is:

1. A bait box having its top closed by an elastic covering comprising, sheets of elastic material superimposed one above the other and secured together at their outer mating edges and having parallel slots in each sheet, the slots of one sheet offset from the slots of the other sheet to provide access to any part of the box to remove the bait therefrom and prevent escape of the live bait through the top of the container.

2. A bait box having an outer container and an inner perforated container, the inner container having its top closed by an elastic covering comprising, sheets of elastic material superimposed one above the other and secured together at their outer mating edges and having parallel slots in each sheet, the slots of one sheet offset from the slots of the other sheet to provide access to any part of the box to remove the bait therefrom and prevent escape of the live bait through the top of the container.

EDWIN L. JOHNSON.
EMORY J. SCOFIELD.

REFERENCES CITED

The following references are of record in the file of this patent:

UNITED STATES PATENTS

| Number | Name | Date |
| --- | --- | --- |
| D. 161,816 | Blakeslee | Feb. 6, 1951 |
| 302,161 | Rudolph | July 15, 1884 |
| 380,136 | Riedel | Mar. 27, 1888 |
| 594,448 | Webber | Nov. 30, 1897 |
| 661,093 | Warren | Nov. 6, 1900 |
| 892,638 | Wilson | July 7, 1908 |
| 1,140,625 | Spitzler | May 25, 1915 |
| 1,150,776 | Lamb | Aug. 17, 1915 |
| 1,183,990 | Lau | May 23, 1916 |
| 1,490,868 | Voell | Apr. 15, 1924 |
| 1,698,018 | Hendricks | Jan. 8, 1929 |
| 1,709,424 | Zohe | Apr. 16, 1929 |